(12) United States Patent
Araki et al.

(10) Patent No.: US 6,777,488 B1
(45) Date of Patent: Aug. 17, 2004

(54) AQUEOUS POLYAMIDE RESIN DISPERSION AND PROCESS FOR PRODUCING THE SAME

(75) Inventors: Eiichi Araki, Hyogo (JP); Norihiro Sugihara, Hyogo (JP); Kaichiro Nakao, Hyogo (JP); Hiroshi Manabe, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 10/019,810

(22) PCT Filed: Apr. 19, 2000

(86) PCT No.: PCT/JP00/02568

§ 371 (c)(1),
(2), (4) Date: Oct. 19, 2001

(87) PCT Pub. No.: WO00/64979

PCT Pub. Date: Nov. 2, 2000

(30) Foreign Application Priority Data

Apr. 21, 1999 (JP) ............................................. 11-113056

(51) Int. Cl.$^7$ .............................. C08J 3/00; C08K 3/20; C08K 7/16; C08L 77/00; C08L 79/00
(52) U.S. Cl. ........................ 524/606; 523/223; 523/322
(58) Field of Search .......................... 524/606; 523/223, 523/322

(56) References Cited

U.S. PATENT DOCUMENTS

| 2,926,117 A | 2/1960 | Wittcoff |
| 4,687,837 A | 8/1987 | Mumcu |

FOREIGN PATENT DOCUMENTS

| EP | 0328301 | 8/1989 |
| JP | 63186738 | 8/1988 |
| JP | 07082423 | 3/1995 |
| WO | 92/15634 | 9/1992 |
| WO | 92/16579 | 10/1992 |
| WO | 93/02125 | 2/1993 |

*Primary Examiner*—Patrick D. Niland
(74) *Attorney, Agent, or Firm*—Merchant & Gould P.C.

(57) ABSTRACT

The aqueous dispersion of polyamide resin of the present invention comprises dispersed polyamide resin particles, basic material and water. The dispersed polyamide resin particles have a weight-average diameter of 0.1–10 μm. The ratio of end carboxyl groups to end amino groups in the polyamide resin is between 60/40 and 100/0. The amount of said basic material added is 0.2–3.0 mol per mol of end carboxyl groups. Such an aqueous dispersion of polyamide resin can be manufactured by adding the polyamide resin to an aqueous dispersion medium containing 0.2–3.0 mol of basic material per mol of end carboxyl groups in the polyamide resin.

13 Claims, No Drawings

AQUEOUS POLYAMIDE RESIN DISPERSION AND PROCESS FOR PRODUCING THE SAME

TECHNICAL FIELD

The present invention relates to an aqueous dispersion of polyamide resin wherein polyamide resin particles are dispersed in an aqueous dispersion medium, and to a method of manufacture thereof.

BACKGROUND ART

Aqueous dispersions of polyamide resin can convey oil a resistance, solvent resistance, chemical resistance, abrasion resistance and gas blocking and adhesive properties and the like when used as a basis in the formation of coating films. Consequently, aqueous dispersions of polyamide resin are widely used in water-color inks, textile treatments, textile fillers, paper treatments, binders, lubricants, steel plate finishing agents, surface modifiers, hot melt adhesives and the like.

It is difficult to prepare a dispersion of polyamide in an aqueous dispersion medium by a direct process of emulsion polymerization in the aqueous dispersion medium because of its manufacturing process. Therefore, various methods have been proposed for manufacturing aqueous dispersions of polyamide resin by dispersion in an aqueous medium of polyamide resin formed by condensation polymerization or ring-opening polymerization. Possible methods of dispersing polyamide resin in an aqueous medium include reprecipitation and post-emulsification.

Reprecipitation is a method of dissolving polyamide resin in an organic solvent, reprecipitating the polyamide resin and replacing the organic solvent with an aqueous medium (see for example Japanese Patent Applications Laid-open No. S61-223059 and S63-186738).

The main problems with reprecipitation are the following. First, the polyamide resin particles obtained from reprecipitation are large in diameter, limiting the uses of the manufactured aqueous dispersion of polyamide resin. Second, polyamide resin particles often re-aggregate when the organic solvent is replaced with an aqueous medium, so the aqueous dispersion of polyamide resin obtained by reprecipitation is lacking in standing stability. Third, the inclusion of the step of replacing the organic solvent with an aqueous medium complicates the manufacturing process in the reprecipitation method.

In the post-emulsification method polyamide resin is dispersed in an aqueous medium as follows. In the first step, polyamide resin is dissolved in a non-water-soluble or slightly water-soluble organic solvent to prepare a polyamide resin solution. In the second step, the polyamide resin solution is mixed together with an emulsifier in an aqueous medium to prepare a mixture. In the third step, the mixture is agitation emulsified at high shear force in a specialized emulsifying apparatus. In the fourth step, the organic solvent is removed from the mixture, resulting in an aqueous dispersion of polyamide resin.

The main problems with post-emulsification are the following. First, because polyamide resin is not very soluble with respect to organic solvents, the post-emulsion method has low productivity and cannot be called economical. Second, because bubbling occurs during removal of the organic solvent in the post-emulsification method, a process is required to control bubbling, complicating the operation and making the method less economical. Third, the aqueous dispersion of polyamide resin obtained by post-emulsification inevitably contains residues of organic solvent and emulsifiers. Fourth, the post-emulsification method uses large quantities of organic solvent which could contaminate the work environment and cause environmental a pollution.

DISCLOSURE OF THE INVENTION

It is an object of the present invention to resolve the various issues discussed above.

The aqueous dispersion of polyamide resin provided by the first aspect of the present invention contains dispersed polyamide resin particles, basic material and water, with the dispersed polyamide resin particles having a weight-average diameter of 0.1–10 μm and a ratio of end carboxyl groups to end amino groups being between 60/40 and 100/0, and with the amount of said basic material being 0.2–3.0 mol per mol of said end carboxyl groups.

Polyamide resin has carboxyl and/or amino groups on the ends. In general, carboxyl groups have a relatively low degree of electrolytic dissociation with respect to water. However, coexisting carboxyl groups with basic material promotes electrolytic dissociation of carboxyl groups in water solution (aqueous dispersion). Consequently, addition of basic material to the aforementioned aqueous dispersion of polyamide resin promotes electrolytic dissociation of end carboxyl groups on the dispersed polyamide resin particles, and improves dispersive power with respect to an aqueous dispersion medium.

The cause of aggregation of dispersed polyamide resin particles is attractive force acting on the particles. One such attractive force can be attributed to hydrogen bond. The aforementioned dispersed polyamide resin particles have relatively few amino groups in proportion to carboxyl groups. Consequently, with the aforementioned aqueous dispersion of polyamide resin there is relatively little hydrogen bonding force acting among the dispersed polyamide resin particles, and excessive aggregation of the dispersed polyamide resin particles is therefore prevented.

Thus, because excessive aggregation of the dispersed polyamide resin particles is controlled with the aforementioned aqueous dispersion of polyamide resin, standing stability is excellent.

An alkali metal hydroxide or amino compound is preferred as the basic material.

Examples of possible alkali metal hydroxide include sodium hydroxide and potassium hydroxide.

In the present invention, the term "amino compound" also includes ammonia.

The method of manufacturing an aqueous dispersion of polyamide resin provided by the second aspect of the present invention is characterized by the addition of polyamide resin to an aqueous dispersion medium containing 0.2–3.0 mol of basic material per mol of end carboxyl groups on the polyamide resin.

As mentioned already, electrolytic dissociation of carboxyl groups is promoted by the coexistence of basic material with polyamide resin, allowing for the prevention of excessive aggregation between polyamide resin particles. The aforementioned method of manufacturing an aqueous dispersion of polyamide resin employs an aqueous dispersion medium containing basic material, providing an aqueous dispersion of polyamide resin with small-diameter polyamide resin particles and excellent standing stability.

The amount of said basic material in the aforementioned aqueous dispersion medium should be in the range of 0.2–3.0 mol per mol of said end carboxyl groups. If the amount of said basic material falls below this range, aggregation of polyamide resin particles will not be sufficiently controlled, making it difficult to obtain an aqueous dispersion of polyamide resin. If the amount of said basic material exceeds this range, the resulting aqueous dispersion of polyamide resin will be impractical due to high alkalinity.

Preferably, the amount of said basic material should be 0.4–2.0 mol per mol of said end carboxyl groups. Particularly favorable results are obtained if the amount of said basic material is 0.6–1.5 mol.

The ratio of said end carboxyl groups to said end amino groups in the polyamide resin should be between 60/40 and 100/0.

As mentioned above, amino groups are one cause of aggregation of polyamide resin particles because of their susceptibility to hydrogen bonding. The polyamide resin used in the aforementioned method of manufacturing an aqueous dispersion of polyamide resin has a relatively small number of end amino groups in proportion to end carboxyl groups. Consequently, the aforementioned manufacturing method avoids excessive aggregation caused by end amino groups, and provides an aqueous dispersion of polyamide resin with excellent standing stability.

The polyamide resin used in the aforementioned method of manufacturing an aqueous dispersion of polyamide resin should have 50–3000 mmol of end carboxyl groups per kg of said polyamide resin. If the amount of end carboxyl groups falls below this range, it will be impossible to adequately disperse the polyamide resin in the aqueous dispersion medium. The upper limit is set at 3000 mmol because there are limits on the amount of end carboxyl groups that can be introduced into polyamide resin. However, because the dispersive force of polyamide resin in aqueous dispersion medium increases as the amount of end carboxyl groups in the polyamide resin increases, the amount of end carboxyl groups should be as large as is economically feasible.

In order to obtain even better results, the amount of end carboxyl groups in the polyamide resin is in the range of 100–2000 mmol per kg of polyamide resin.

In the method of manufacturing an aqueous dispersion of polyamide resin of the present invention, a polyamide resin containing as a structural unit at least one from the group of —[NH(CH$_2$)$_5$CO]—, —[NH(CH$_2$)$_6$NHCO(CH$_2$)$_4$CO]—, —[(NH(CH$_2$)$_6$NHCO(CH$_2$)$_8$CO]—, —[NH(CH$_2$)$_{10}$CO)]— and —[NH(CH$_2$)$_{11}$CO] is used by preference.

Specific examples of polyamide resin include 6-nylon, 66-nylon, 610-nylon, 11-nylon, 12-nylon, 6/66 copolymer nylon, 6/610 copolymer nylon, 6/11 copolymer nylon, 6/12 copolymer nylon, 6/66/11 copolymer nylon, 6/66/12 copolymer nylon, 6/66/11/12 copolymer nylon and 6/66/610/11/12 copolymer nylon. In the said method of manufacturing an aqueous dispersion of polyamide resin, the listed polymers or copolymers can be used individually or more than one can be used in combination as the polyamide resin.

The polyamide resin used in the said method of manufacturing an aqueous dispersion of polyamide resin can be manufactured by a well-known method. For example, methods that can be used for manufacturing the polyamide resin include condensation polymerization of diamines with dicarboxylic acids, condensation polymerization of Ω-amino-Ω'-carboxylic acids, or ring-opening polymerization of ring lactams.

Specific examples of diamines include ethylene diamine, trimethylene diamine, tetramethylene diamine, pentamethylene diamine, hexamethylene diamene, 1,7-diaminoheptane, 1,8-diaminooctane, 1,9-diaminononane, 1,10-diaminodecane, phenylene diamine, and methaxylilene diamine.

Specific examples of dicarboxylic acids include glutaric acid, adipic acid, pimelic acid, suberic acid, azelaicacid, sebacicacid, nonane dicarboxylic acid, decane dicarboxylic acid, tetradecane dicarboxylic acid, octadecane dicarboxylic acid, fumaric acid, phthalic acid, and xylilene dicarboxylic acid.

Specific examples of Ω-amino-Ω'-carboxylic acids include 6-aminocaproic acid, 7-aminoheptanoic acid, 9-aminononanoic acid, 11-aminoundecanoic acid, and 12-aminododecanoic acid.

Specific examples of ring lactams include ε-caprolactam, Ω-enantholactam and Ω-lauryllactam.

In order to adjust the proportion of end carboxyl groups to end amino groups in the polyamide resin to between 60/40 and 100/0, a specific amount of a dicarboxylic or monocarboxylic acid can be added as a polymerization regulator during condensation polymerization or ring-opening polymerization.

Specific examples of dicarboxylic acids that can be used as the said polymerization regulator include glutaric acid, adipic acid, pimelic acid, suberic acid, azelaic acid, sebacic acid, nonane dicarboxylic acid, decane dicarboxylic acid, tetradecane dicarboxylic acid, octadecane dicarboxylic acid, fumaric acid, phthalic acid and xylilene dicarboxylic acid.

Specific examples of monocarboxylic acids that can be used as the said polymerization regulator include caproic acid, heptanoic acid, nonanoic acid, undecanoic acid and dodecanoic acid.

Possible basic materials for mixing with the aqueous dispersion medium include alkali metal hydroxides or amino compounds.

Examples of said alkali metal hydroxides include lithium hydroxide, sodium hydroxide, potassium hydroxide, rubidium hydroxide, cesium hydroxide and francium hydroxide. Of these alkali metal hydroxides, sodium hydroxide and potassium hydroxide are used by preference in the present invention since they effectively enhance the dispersive force of the polyamide resin.

Well-known amino compounds including ammonia can be used as the said amino compounds.

The amount of water in the aqueous dispersion medium should be 30–1500 parts by weight based on 100 parts by weight of polyamide resin. If the amount of water falls below this range, the polyamide resin cannot be adequately dispersed in the aqueous dispersion medium, while if the amount of water exceeds this range, the concentration of polyamide resin in the resulting aqueous dispersion of polyamide resin will be excessively low.

In order to obtain still better results, the amount of water is kept in the range of 100–500 parts by weight based on 100 parts by weight of polyamide resin.

A variety of additives including high polymer dispersants, inorganic dispersants, anionic surfactants, nonionic surfactants, ampholytic surfactants and antioxidants may be added to the aqueous dispersion medium as long as they do not detract from the properties of the resulting aqueous dispersion of polyamide resin.

Examples of high polymer dispersants include polyacrylate, polystyrene sulfonate, styrene anhydrous maleate, polyvinyl alcohol and hydroxyethyl cellulose.

Examples of inorganic dispersants include alumina sol, silica sol and calcium phosphate.

Examples of anionic surfactants include rosin acid salts, fatty acid salts and alkylbenzene sulfonate.

Examples of nonionic surfactants include polyoxyethylene alkyl ether, glycerine fatty acid ester and polyoxyethylene fatty acid ethanolamide.

In the preferred embodiments, the polyamide resin is heated to a temperature above the softening point of the polyamide resin for dispersion in the aqueous dispersion medium. Heating the polyamide resin to above this softening point releases the associations between molecules and aggregation among particles. Consequently, the diameter of the polyamide resin particles can be minimized. Also, as explained above, aggregation (or re-aggregation) among polyamide resin particles is controlled by the addition of basic material and by the presence of carboxyl groups, so the particles of polyamide resin are maintained in the aqueous dispersion with a small diameter in a suitable dispersed state.

The heating temperature of the polyamide resin cannot be stated univocally because it is determined for example according to the melting point of the polyamide resin (the type and degree of polymerization of the structural units). However, if the heating temperature is too low, the polyamide does not soften sufficiently and cannot be dispersed in the aqueous dispersion medium, while if the heating temperature is too high the polyamide resin is vulnerable to degradation. Consequently, the heating temperature of the polyamide resin is generally in the range of 70–300 or preferably 90–220° C.

Ideally, the polyamide resin is dispersed in the aqueous dispersion medium by application of shear force to an aqueous dispersion medium to which the polyamide resin has been added.

When applied to an aqueous dispersion medium to which polyamide resin has been added, shear force releases associations between molecules and/or aggregation among particles of the polyamide resin. This results not only in small diameter polyamide resin particles, but also in uniform dispersion of the polyamide resin particles in the aqueous dispersion medium.

Application of shear force to the aqueous dispersion medium can be achieved for example by agitation of the aqueous dispersion medium. The aqueous dispersion medium can be agitated for example by rotation of mixing blades. In this case, the rotational frequency of the mixing blades is set for example at 100–500 times a minute. The rotational frequency of the mixing blades is set above 100 times a minute in order to obtain an adequate agitation effect. Rotation of the mixing blades over 500 times a minute provides no benefit proportional to the increased rotation and only increases costs.

BEST MODE FOR CARRYING OUT THE INVENTION

The following are two possible means of manufacturing the aqueous dispersion of polyamide resin of the present invention.

The first manufacturing method comprises the following steps.

In the first step, specific quantities of polyamide resin, water and basic material are supplied in one batch to a dispersion tank.

In the second step, the aqueous dispersion medium is agitated using a mixing blade at 100–500 rpm while being heated to a temperature above the softening temperature of the polyamide resin in the aqueous dispersion medium, raising the temperature of both aqueous dispersion medium and polyamide resin.

In the third step, the temperature of both aqueous dispersion medium and polyamide resin is maintained at a temperature above the softening temperature of the polyamide resin, while agitation is continued for about 10–60 minutes using a mixing blade at 100–500 rpm.

The second manufacturing method comprises the following steps.

In the first step, a dispersion tank is first heated to a temperature above the softening temperature of the polyamide resin in the aqueous dispersion medium, and kept under pressure.

In the second step, the heating and pressure conditions of the dispersion tank are maintained, and fixed amounts of melted polyamide resin, water and basic material are added separately one after another to the dispersion tank with a mixing blade being rotated at 100–500 rpm.

In the third step, agitation is continued for about 10–60 minutes using a mixing blade at 100–500 rpm while maintaining the dispersion tank at a temperature above the softening temperature of the polyamide resin in the aqueous dispersion medium.

The dispersion tank used in the aforementioned methods may be any pressure proof container equipped with a means for heating to a temperature above the softening temperature of the polyamide resin in the aqueous dispersion medium and a means of agitation sufficient to apply shear force to the contents. For example, a pressure proof autoclave equipped with an agitator can be used as the dispersion tank in the aforementioned manufacturing methods.

In either one of the aforementioned manufacturing methods, the polyamide resin is subject to shear force from agitation while in a softened state in the aqueous dispersion medium. Consequently, the associations between molecules and aggregations of particles of the polyamide resin are released, the particle diameter is minimized, and dispersal is uniform in the aqueous dispersion medium. Moreover, electrolytic dissociation of end carboxyl groups in the polyamide resin is promoted by the effect of the basic material. The disassociated carboxyl groups (carboxylate ions) serve the purpose of a stabilized emulsifier in the aqueous dispersion medium, enhancing the hydrophilicity of the polyamide resin as a whole and preventing excessive aggregation between molecules in the manufacturing process. As a result, either of the aforementioned manufacturing methods results in dispersion in an aqueous dispersion medium of fine polyamide particles with a weight average particle diameter of 0.1–10 $\mu$m.

The aqueous dispersion of polyamide resin obtained in this way can be adjusted to the desired concentration using a suitable concentration means such as a semipermeable membrane.

It is also possible to use the resulting aqueous dispersion of polyamide resin in the form of a fine powder obtained by a drying method such as spray drying, either as is or following solid-liquid separation by centrifugation or filtration.

Next, the present invention is explained in more detail using examples and comparative examples. However, the scope of the technical concept of the present invention is not limited by these examples.

EXAMPLE 1

In this example, the raw materials were placed in an autoclave equipped with a turbine type agitator and a heating jacket, the autoclave was sealed, and an aqueous dispersion of polyamide resin was manufactured by heating the raw materials while applying shear force.

The autoclave had an internal diameter of 700 mm, a height of 1500 mm and a content volume of 450 L. The mixing blade had a diameter of 350 mm. The heating jacket worked by the circulation of heated oil.

The raw materials were 120 kg of 6/66/12 copolymer nylon, 179.6 kg of water and 0.4 kg (10 mol) of sodium hydroxide. In the 6/66/12 copolymer nylon, the ratio of end carboxyl groups to end amino groups was 87/13, and the amount of end carboxyl groups was 130 mmol per kg of polyamide resin.

The autoclave was heated to 150° C. and then maintained at 150° C. for 30 minutes. The rotational speed of the mixing blade was 150 times a minute.

After being heated and mixed in this way, the contents of the autoclave were cooled to 50° C., and removed from the autoclave as the aqueous dispersion of polyamide resin of the present invention.

In this aqueous dispersion of polyamide resin, the weight average particle diameter of the polyamide resin was 1.2 μm as measured with a laser diffraction particle size distribution meter (Shimadzu Seisakusho SALD 2000). Observation of the aqueous dispersion of polyamide resin after it had been left for 1 month at 50° C. showed excellent standing stability, with absolutely no aggregative or floating disassociation of the polyamide resin.

EXAMPLE 2

In this example, an aqueous dispersion of polyamide resin was manufactured under the same conditions as in Example 1, except that the raw materials were 6/66/12 copolymer nylon having a ratio of end carboxyl groups to end amino groups of 92/8 and an amount of end carboxyl groups of 165 mmol per kg of polyamide resin, together with 178.8 kg of water and 1.2 kg (21.8 mol) of potassium hydroxide.

In this aqueous dispersion of polyamide resin, the weight average particle diameter of the polyamide resin was 0.3 μm as measured with a laser diffraction particle size distribution meter (Shimadzu Seisakusho SALD 2000). Observation of the aqueous dispersion of polyamide resin after it had been left for 1 month at 50° C. showed excellent standing stability, with absolutely no aggregative or floating disassociation of the polyamide resin.

EXAMPLE 3

In this example, the raw materials were 120 kg of 6/66/11/12 copolymer nylon, 179.2 kg of water and 0.8 kg (20.0 mol) of sodium hydroxide. The 6/66/11/12 copolymer nylon had a ratio of end carboxyl groups to end amino groups of 72/28 and an amount of end carboxyl groups of 170 mmol per kg of polyamide resin. Using these raw materials and an autoclave similar to that used in Example 1, an aqueous dispersion of polyamide resin was manufactured. The inside of the autoclave was heated to 170° C. and then maintained at that temperature for 30 minutes. The rotational speed of the mixing blade was 150 times a minute.

In the resulting aqueous dispersion of polyamide resin, the weight average particle diameter of the polyamide resin was 1.1 μm as measured with a laser diffraction particle size distribution meter (Shimadzu Seisakusho SALD 2000). Observation of the aqueous dispersion of polyamide resin after it had been left for 1 month at 50° C. showed excellent standing stability, with absolutely no aggregative or floating disassociation of the polyamide resin.

EXAMPLE 4

In this example, the raw materials were 120 kg of 6/12 copolymer nylon, 179.4 kg of water and 0.6 kg (10.7 mol) of potassium hydroxide. The 6/12 copolymer nylon had a ratio of end carboxyl groups to end amino groups of 88/12 and an amount of end carboxyl groups of 120 mmol per kg of polyamide resin. Using these raw materials and an autoclave similar to that used in Example 1, an aqueous dispersion of polyamide resin was manufactured. The inside of the autoclave was heated to 170° C. and then maintained at that temperature for 30 minutes. The rotational speed of the mixing blade was 150 times a minute.

In the resulting aqueous dispersion of polyamide resin, the weight average particle diameter of the polyamide resin was 1.8 μm as measured with a laser diffraction particle size distribution meter (Shimadzu Seisakusho SALD 2000). Observation of the aqueous dispersion of polyamide resin after it had been left for 1 month at 50° C. showed excellent standing stability, with absolutely no aggregative or floating disassociation of the polyamide resin.

EXAMPLE 5

In this example, the raw materials were 120 kg of 6/66/610/11/12 copolymer nylon, 179.5 kg of water and 0.5 kg (12.5 mol) of sodium hydroxide. The 6/66/610/11/12 copolymer nylon had a ratio of end carboxyl groups to end amino groups of 66/34 and an amount of end carboxyl groups of 120 mmol per kg of polyamide resin. Using these raw materials and an autoclave similar to that used in Example 1, an aqueous dispersion of polyamide resin was manufactured.

The inside of the autoclave was heated to 150° C. and then maintained at that temperature for 30 minutes. The rotational speed of the mixing blade was 150 times a minute.

In the resulting aqueous dispersion of polyamide resin, the weight average particle diameter of the polyamide resin was 2.3 μm as measured with a laser diffraction particle size distribution meter (Shimadzu Seisakusho SALD 2000). Observation of the aqueous dispersion of polyamide resin after it had been left for 1 month at 50° C. showed excellent standing stability, with absolutely no aggregative or floating disassociation of the polyamide resin.

EXAMPLE 6

In this example, the raw materials were 120 kg of 12-nylon, 179.2 kg of water and 0.4 kg (10.0 mol) of sodium hydroxide. The 12-nylon had a ratio of end carboxyl groups to end amino groups of 85/15 and an amount of end carboxyl groups of 90 mmol per kg of polyamide resin. Using these raw materials and an autoclave similar to that used in Example 1, an aqueous dispersion of polyamide resin was manufactured. The inside of the autoclave was heated to 200° C. and then maintained at that temperature for 30 minutes. The rotational speed of the mixing blade was 150 times a minute.

In the resulting aqueous dispersion of polyamide resin, the weight average particle diameter of the polyamide resin was 3.8 μm as measured with a laser diffraction particle size distribution meter (Shimadzu Seisakusho SALD 2000). Observation of the aqueous dispersion of polyamide resin after it had been left for 1 month at 50° C. showed excellent standing stability, with absolutely no aggregative or floating disassociation of the polyamide resin.

Comparative Example 1

In this comparative example, the raw materials were 120 kg of 6/66/12 copolymer nylon and 180.0 kg of water. In other words, no basic compound was included in the raw materials of this comparative example. The 6/66/12 copolymer nylon was similar to that used in Example 1.

Using these raw materials and an autoclave similar to that used in Example 1, an aqueous dispersion of polyamide resin was manufactured. The inside of the autoclave was heated to 150° C. and then maintained at that temperature for 30 minutes. The rotational speed of the mixing blade was 150 times a minute.

The contents obtained in this way were a lump of polyamide resin rather than an aqueous dispersion.

Comparative Example 2

In this comparative example, the raw materials were 120 kg of 6/66/12 copolymer nylon, 179.6 kg of water and 0.1 kg (2.5 mol) of sodium hydroxide. The 6/66/12 copolymer nylon was similar to that used in Example 1.

Using these raw materials and an autoclave similar to that used in Example 1, an aqueous dispersion of polyamide resin was manufactured. The inside of the autoclave was heated to 150° C. and then maintained at that temperature for 30 minutes. The rotational speed of the mixing blade was 150 times a minute.

The contents obtained in this way were in the form of aggregated polyamide resin, not an aqueous dispersion.

Comparative Example 3

In this comparative example, the raw materials were 120 kg of 6/66/12 copolymer nylon, 179.6 kg of water and 0.14 kg (3.5 mol) of sodium hydroxide. The 6/66/12 copolymer nylon had a ratio of end carboxyl groups to end amino groups of 18/82, and an amount of end carboxyl groups of 30 mmol per kg of polyamide resin.

Using these raw materials and an autoclave similar to that used in Example 1, an aqueous dispersion of polyamide resin was manufactured. The inside of the autoclave was heated to 150° C. and then maintained at that temperature for 30 minutes. The rotational speed of the mixing blade was 150 times a minute.

The contents obtained in this way were in the form of aggregated polyamide resin, not an aqueous dispersion.

Comparative Example 4

In this comparative example, the raw materials were 120 kg of 6/66/12 copolymer nylon, 179.6 kg of water and 0.4 kg (10.0 mol) of sodium hydroxide. The 6/66/12 copolymer nylon was similar to that used in Comparative Example 3.

Using these raw materials and an autoclave similar to that used in Example 1, an aqueous dispersion of polyamide resin was manufactured. The inside of the autoclave was heated to 150° C. and then maintained at that temperature for 30 minutes. The rotational speed of the mixing blade was 150 times a minute.

The contents obtained in this way were in the form of aggregated polyamide resin, not an aqueous dispersion.

What is claimed is:

1. An aqueous dispersion of polyamide resin, comprising: dispersed polyamide resin particles, basic material and water;

wherein the weight average diameter of said dispersed polyamide resin particles is 0.1–10 μm;

the ratio of end carboxyl groups to end amino groups in said polyamide resin ranges from 66/34 to 92/8;

the amount of said end carboxyl groups is 90–170 mmol per kg of said polyamide resin;

the amount of said basic material added is 0.2–3.0 mol per mol of said end carboxyl groups; and said polyamide resin has as a structural unit at least one selected from the group consisting of $-[NH(CH_2)_5CO]-$, $-[NH(CH_2)_6NHCO(CH_2)_4CO]-$, $-[NH(CH_2)_6NHCO(CH_2)_8CO]-$, $-[NH(CH_2)_{10}CO]-$ and $-[NH(CH_2)_{11}CO]-$.

2. The aqueous dispersion of polyamide resin according to claim 1, wherein said basic material is an alkali metal hydroxide or amino compound.

3. The aqueous dispersion of polyamide resin according to claim 2, wherein said alkali metal hydroxide is sodium hydroxide or potassium hydroxide.

4. The aqueous dispersion of polyamide resin according to claim 1, wherein the proportion of said water is 30–1500 parts by weight based on 100 parts by weight of polyamide resin.

5. A method of manufacturing an aqueous dispersion of polyamide resin, comprising the steps of: adding polyamide resin to an aqueous dispersion medium containing 0.2–3.0 mol of basic material per mol of end carboxyl groups in said polyamide resin, and causing said polyamide resin to disperse in said dispersion medium as polyamide resin particles;

wherein the weight average diameter of said dispersed polyamide resin particles is 0.1–10 μm;

the ratio of end carboxyl groups to end amino groups in said polyamide resin ranges from 66/34 to 92/8;

the amount of said end carboxyl groups is 90–170 mmol per kg of said polyamide resin; and said polyamide resin has as a structural unit at least one selected from the group consisting of $-[NH(CH_2)_5CO]-$, $-[NH(CH_2)_6NHCO(CH_2)_4CO]-$, $-[NH(CH_2)_6NHCO(CH_2)_8CO]-$, $-[NH(CH_2)_{10}CO]-$ and $-[NH(CH_2)_{11}CO]-$.

6. The method of manufacturing an aqueous dispersion of polyamide resin according to claim 5, wherein said basic material is an alkali metal hydroxide or amino compound.

7. The method of manufacturing an aqueous dispersion of polyamide resin according to claim 6, wherein said alkali metal hydroxide is sodium hydroxide or potassium hydroxide.

8. The method of manufacturing an aqueous dispersion of polyamide resin according to claim 5, wherein said aqueous dispersion medium contains 30–1500 parts by weight of water based on 100 parts by weight of said polyamide resin.

9. The method of manufacturing an aqueous dispersion of polyamide resin according to claim 5, wherein said polyamide resin is dispersed in said aqueous dispersion medium in a state where the polyamide resin is heated to a temperature at or above the softening temperature of the resin.

10. The method of manufacturing an aqueous dispersion of polyamide resin according to claim 9, wherein said polyamide resin is heated at a temperature of 70° C.–300° C.

11. The method of manufacturing an aqueous dispersion of polyamide resin according to claim 10, wherein said polyamide resin is dispersed in said aqueous dispersion medium with shear force applied to the aqueous dispersion medium to which the polyamide resin has been added.

12. The method of manufacturing an aqueous dispersion of polyamide resin according to claim 11, wherein shear force is applied to said aqueous dispersion medium by rotation of a mixing blade.

13. The method of manufacturing an aqueous dispersion of polyamide resin according to claim 12, wherein the rotational speed of said mixing blade is 100–500 rpm.

* * * * *